United States Patent [19]
Ramsay

[11] 3,817,112
[45] June 18, 1974

[54] VARIABLE RATIO FRICTION DRIVE SPEED CHANGERS

[76] Inventor: James Frederick Ramsay, R.R. No. 1, Caledon East, Ontario, Canada

[22] Filed: Dec. 1, 1972

[21] Appl. No.: 311,117

[52] U.S. Cl. .................................. 74/201, 74/190
[51] Int. Cl. ...................... F16h 15/38, F16h 17/04
[58] Field of Search ...................... 74/201, 190, 200

[56] References Cited
UNITED STATES PATENTS
3,446,088   5/1969   Giant .................................. 74/201

*Primary Examiner*—Benjamin W. Wyche
*Assistant Examiner*—Allan Russell Burke
*Attorney, Agent, or Firm*—W. Britton Moore

[57] ABSTRACT

A variable ratio friction drive speed changer has a driving head mounted on the input shaft with a number of friction wheels mounted on the periphery thereof to make inclined driving contact against arcuate driven surfaces of a pair of adjoining output spools.

In one arrangement the friction wheels are mounted to castor in load-sensing relation with the output spools, while in a further embodiment there is provided a selective control having a capability to operate the speed changer in reverse gear.

14 Claims, 21 Drawing Figures

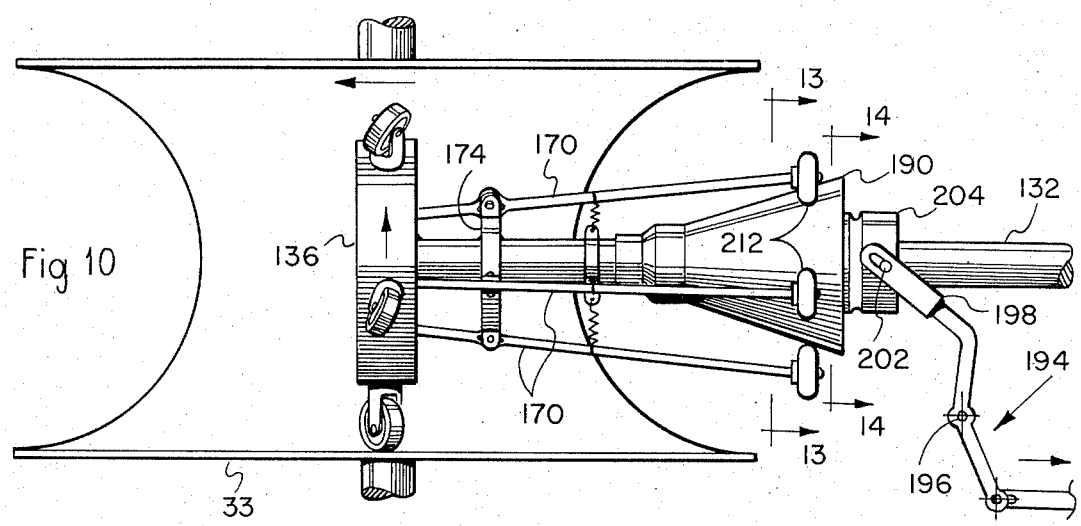
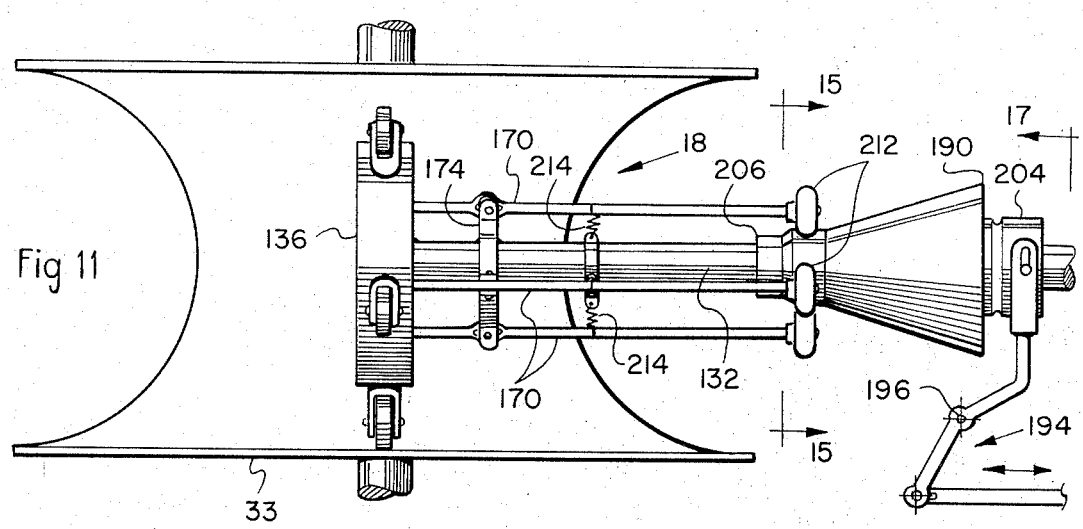
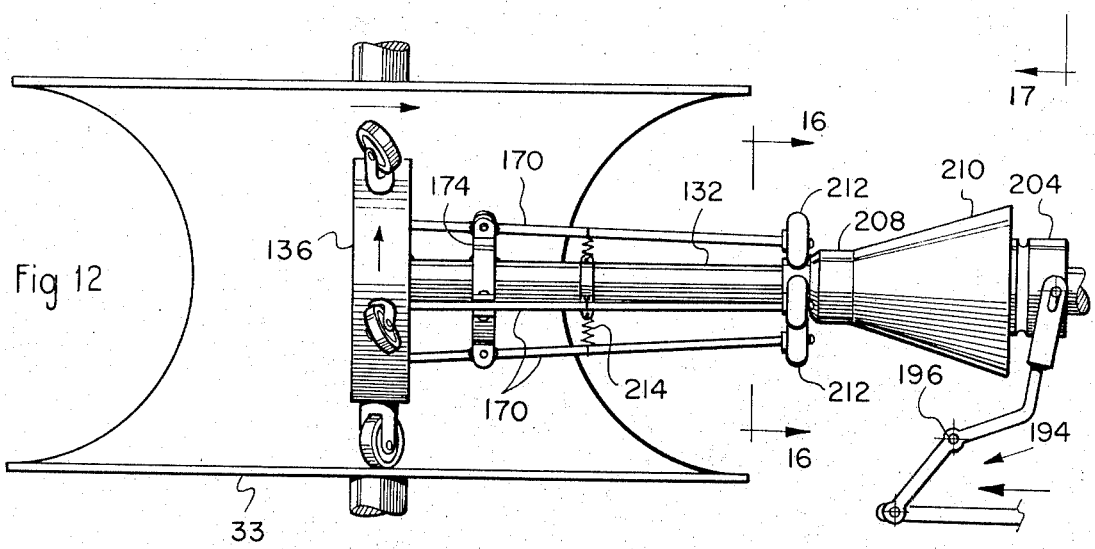

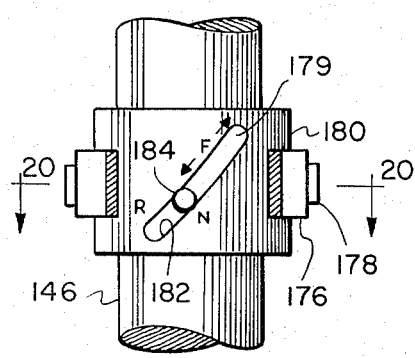
Fig 19
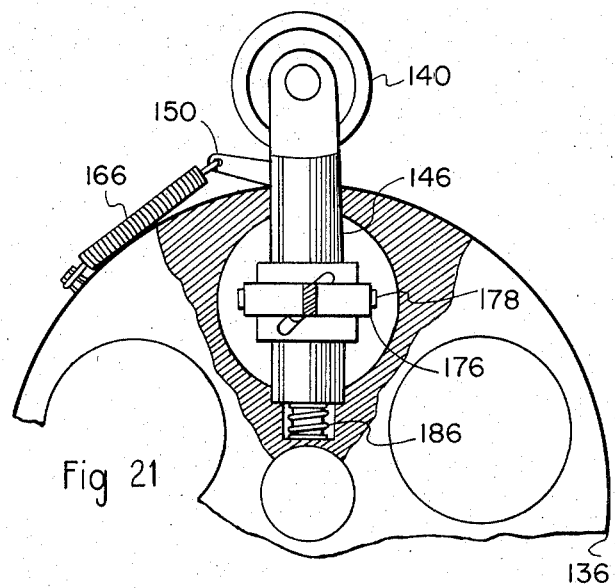
Fig 21
Fig 20
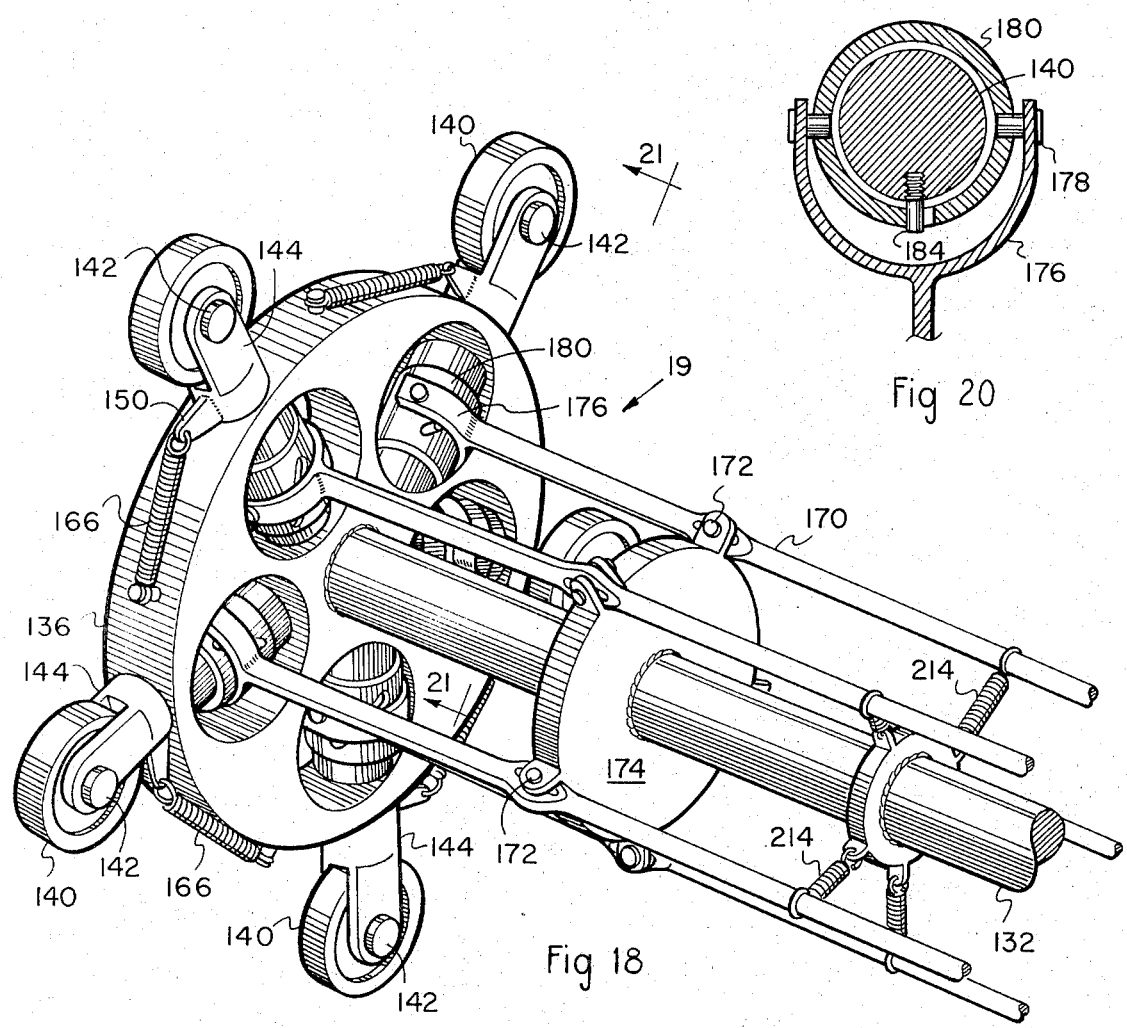
Fig 18

VARIABLE RATIO FRICTION DRIVE SPEED CHANGERS

BACKGROUND OF THE INVENTION

This invention is directed to a friction drive speed changer and in particular to a speed changer having a wide range of output speed variations.

In the provision of speed changers capable of providing a variable speed or variable torque output for a prime mover, much effort has been directed to the development of friction drive units of the stepless type having the capability to provide a range of stepless ratio selection. Most such prior arrangements are characterized by complex mechanisms, many of which are subject to high rates of wear.

An object of the present invention is to provide a simple, mechanically operated variable speed changer device.

A further object of the invention is to provide a simple mechanical speed changer having an automatic speed change capability.

Yet another object of the present invention is to provide a speed changer having selective ratio change capability.

A further object of this invention is to provide a friction drive speed changer of simple arrangement having a reverse drive capability.

SUMMARY OF THE INVENTION

The present invention thus provides a variable speed changer device to provide speed variation between the input and the output thereof, comprising a rotatable driven input shaft having drive head means mounted thereon for rotation in a first plane normal to the axis of the input shaft, the head having a plurality of swivel means mounted in mutually spaced relation about the head for rotation therewith and having drive wheel portions thereof extending radially outwardly of the head, each swivel means being swivelably mounted to permit variable angular inclination of the plane of rotation of the drive wheel portions relative to the first plane; at least one output shaft mounted in spaced relation adjacent the drive head means for rotation on an axis substantially parallel to the first plane; a driven spool mounted on an output shaft in driving relation therewith having an arcuately profiled surface portion thereof to receive the drive wheel portions in successive arcuately displaced rotational relation thereacross upon rotation of the input shaft and the head means, and pitch control means to regulate the swivel inclination of each swivel means relative to the first plane to vary the relative impartation of motion of the drive wheel portions to the spool rotation of the input shaft.

In a preferred embodiment of the invention the pitch control means, includes swivel angle selection means, pitch control actuating means having at least two alternative positions with the selection means connected in controlling relation to select a position thereof, and control connecting means connecting the actuating means with the swivel means to position the swivel means at a selected swivel angle.

In both of the disclosed embodiments, where the driven spool has an arcuate surface of revolution with a marked difference between the major and minor diameters thereof, the passage of drive wheel portions thereacross requires cyclic variation of the pitch angle of the swivelling drive wheels if undue stress or wear are to be avoided. Thus the selected pitch angle for the swivel means varies cyclically in accordance with the distance of the drive wheel from the axis of the spool.

In the case of the preferred load sensing embodiment, this cyclic variation occurs automatically, while in the case of the selective pitch arrangement provision is made to produce the desired cyclic variation of pitch angle.

BRIEF DESCRIPTION OF THE DRAWINGS

Certain embodiments of the present invention are described, reference being made to the accompanying drawings, wherein;

FIG. 10 is a view similar to FIG. 3, of the modified embodiment, showing the pitch control in a high ratio setting;

FIG. 11 is a view similar to FIG. 10, showing the pitch control in a neutral setting;

FIG. 12 is a view similar to FIG. 10 showing the pitch control in a reverse output setting;

FIG. 18 is a perspective view of the drive head of the modified structure of FIG. 8, taken in the direction of the arrow 18 in FIG. 11;

FIG. 19 is a fragmentary view partly in section illustrating the pitch control for one of the wheels;

FIG. 20 is a cross sectional view taken on the line 20—20 of FIG. 19;

FIG. 21 is a fragmentary view partly in section of the portion of the drive head indicated by the arrow 21 in FIG. 18.

DESCRIPTION OF THE PREFERRED EMBODIMENTS

Figure 1:
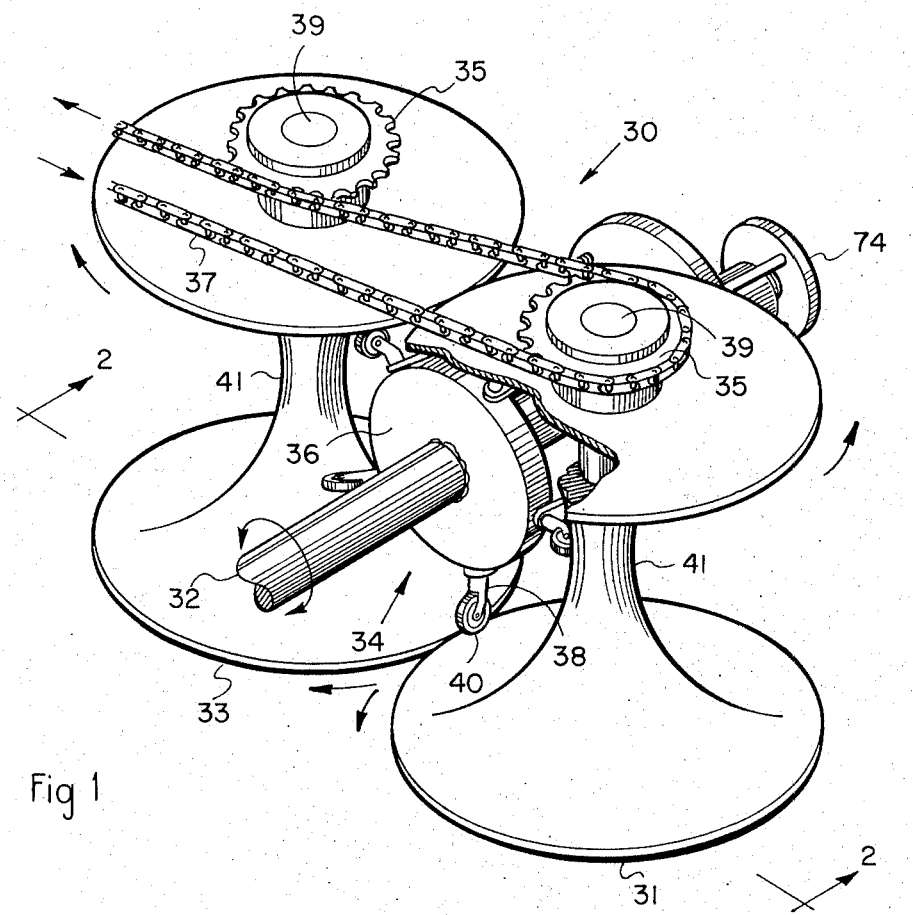
FIG. 1 is a front perspective view of my variable ratio friction drive speed changer, a portion of one of the spools, the output shaft and spool drive chain being broken away.
Figure 2:
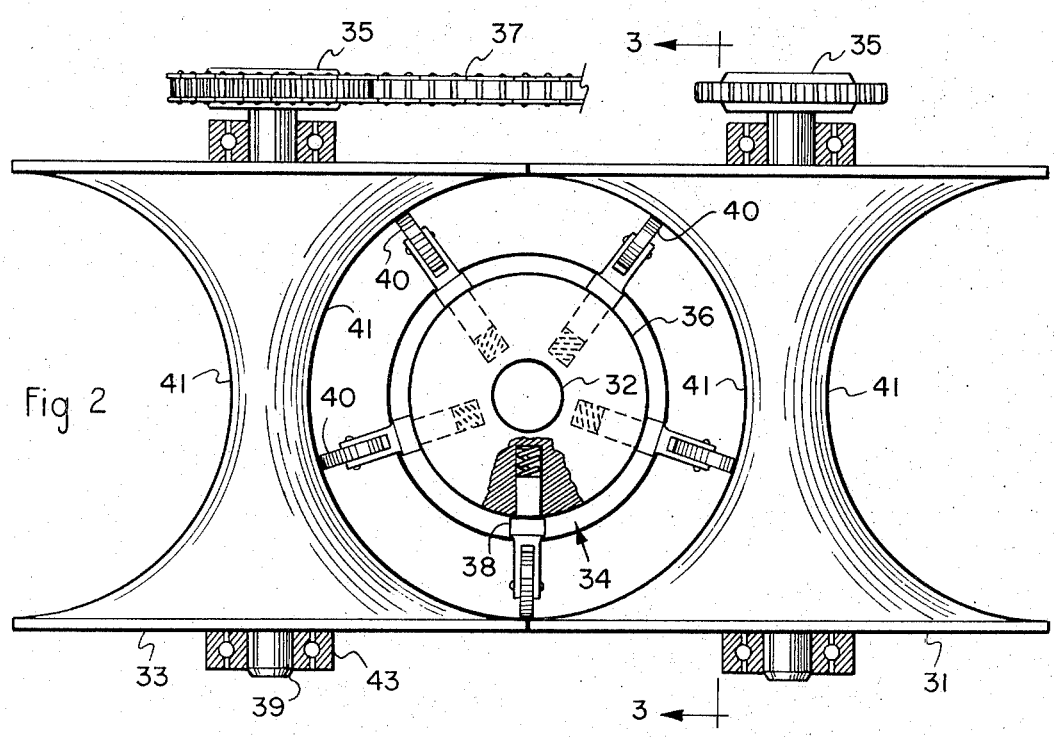
FIG. 2 is a front elevation of FIG. 1 taken on the line 2—2 of FIG. 1.
Figure 3:
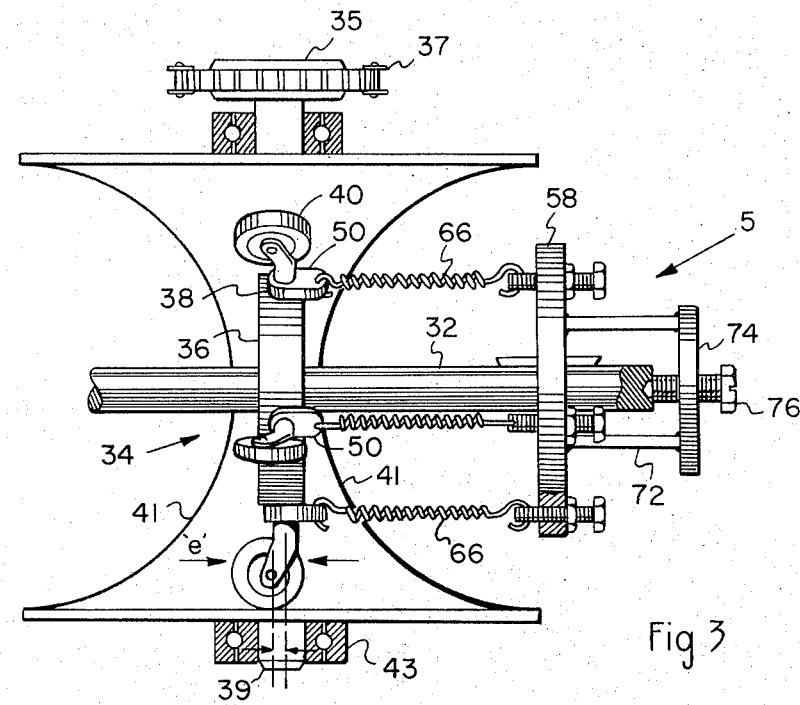
FIG. 3 is a side elevational view taken on the line 3—3 of FIG. 2, the device being shown in standstill condition.

Referring to the drawings in FIG. 1 the main rotary components of the speed changer, indicated generally by the numeral 30, comprise a rotatable input shaft 32 having a drive head assembly 34 secured thereto for rotation with the shaft 32.

Figure 5:
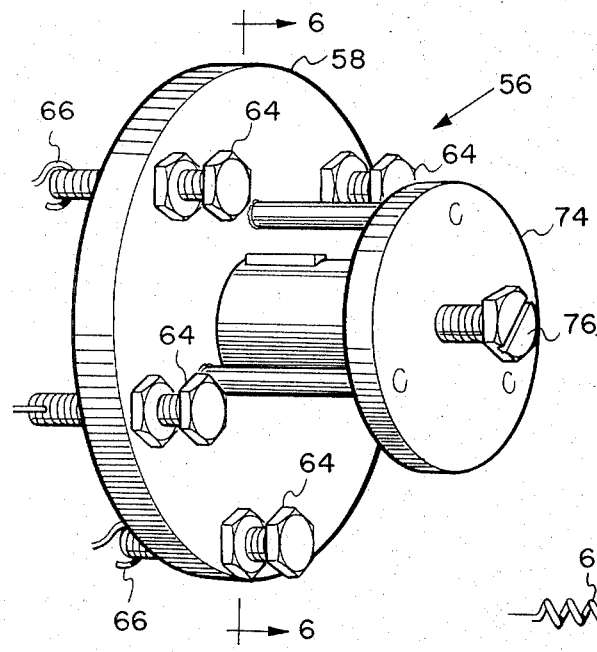
FIG. 5 is a perspective view taken in the direction indicated by the arrow 5 in FIG. 3.
Figure 6:
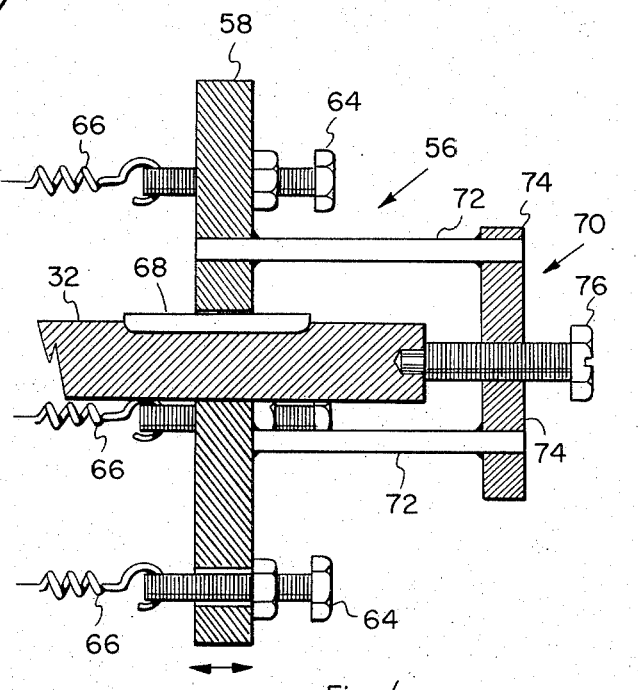
FIG. 6 is a cross sectional view taken on the line 6—6 of FIG. 5.

The head assembly 34 (see also FIGS. 2 to 7) consists of a disc 36 having five swivel means 38 spaced thereabout in the illustrated embodiment. Each swivel means 38 (FIG. 7) has a wheel member 40 rotatably mounted on an axle 42 carried in a pair of forks 44. The forks 44 are each swivel mounted on an eccentric stub shaft 46 journalled in the edge of the disc 36 in inwardly radially extending relation, and having a spring 48 resisting inward displacement of the respective wheel 40 under working load conditions. A torque arm 50 is recessed at 52 to receive one end of a loading spring 66, having the other end thereof attached to load adjustment means 56 (FIGS. 5 and 6).

The load adjustment means 56 comprises a base plate 58 having five adjustment bolts 64 for adjustment of the tension in the respective springs 66. The base plate 58 is slidably positioned at 68 adjacent one end of input shaft 43, with a spacer cage 70, having legs 72 and an end plate 74 to transmit thrust from adjustment bolt 76 to the base plate 58.

Adjustment of the bolt 76 controls the tension setting of all of the springs 66 in loading or unloading relation with the torque arms 50, while adjustment of the individual spring loads is for purposes of equally loading the swivel means 38 of the machine.

Referring more specifically to FIGS. 1 to 4, the speed changer 30 is illustrated having a pair of spool members 31, 33, each having an output sprocket 35 interconnected by a tensioned chain 37 for driving a load, not shown. The spools 31, 33 are rotatably mounted on shafts 39 carried in bearing 41.

The illustrated spool embodiments 31, 33 have profiled surfaces of revolution 41 that are substantially arcuate. The opposing spool profiles together constitute substantially a circle to receive the wheel members 40 in successive rolling relation thereabout, on rotation of the input shaft 32.

Figure 7:
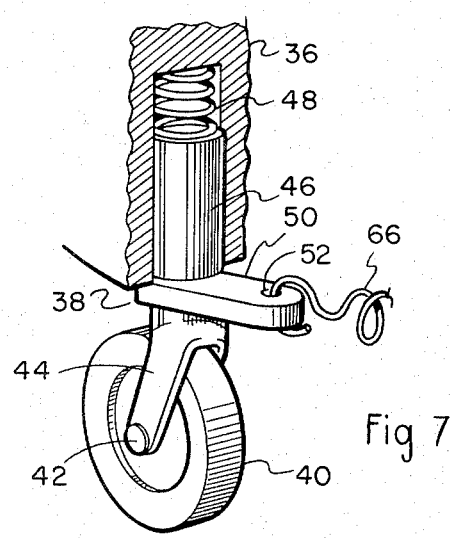
FIG. 7 is a fragmentary perspective view showing one of the swivel wheels and its mounting.
Figure 8:
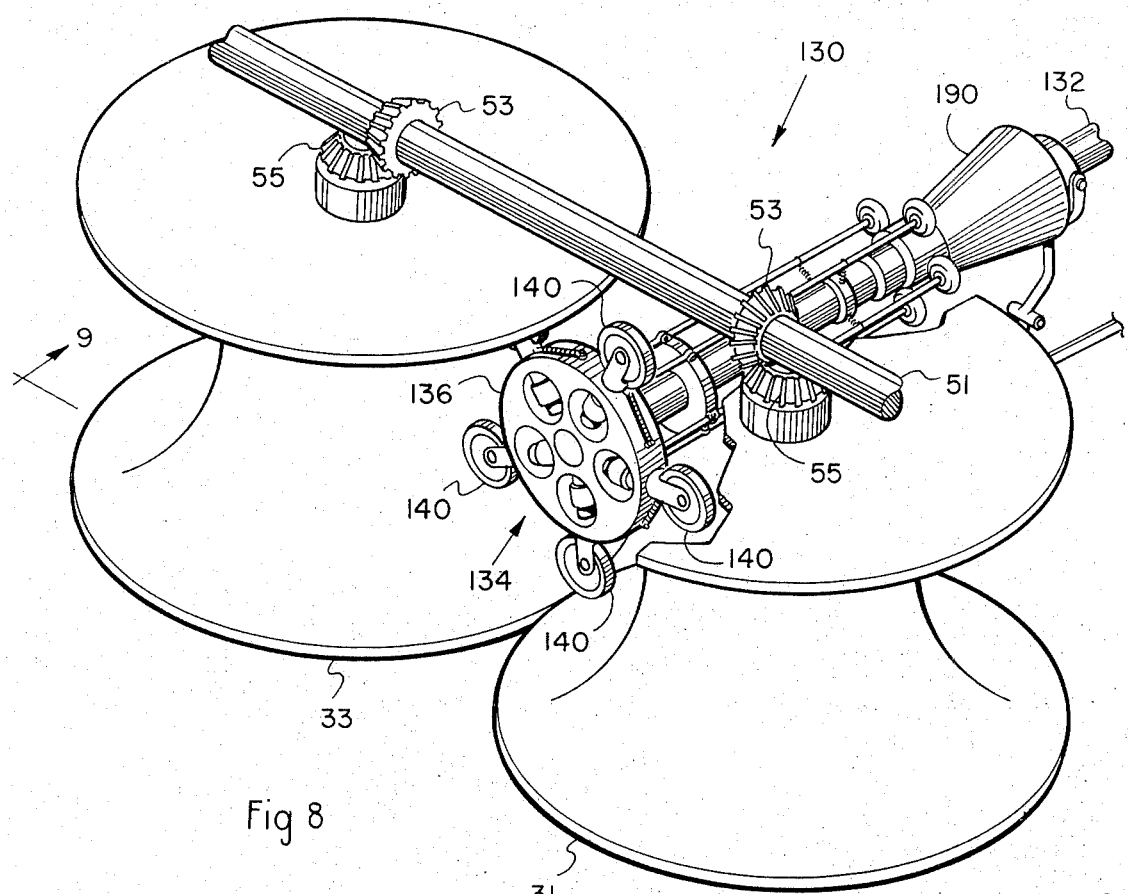
FIG. 8 is a view similar to FIG. 1 of a modified embodiment of the invention having a manual ratio control.
Figure 9:
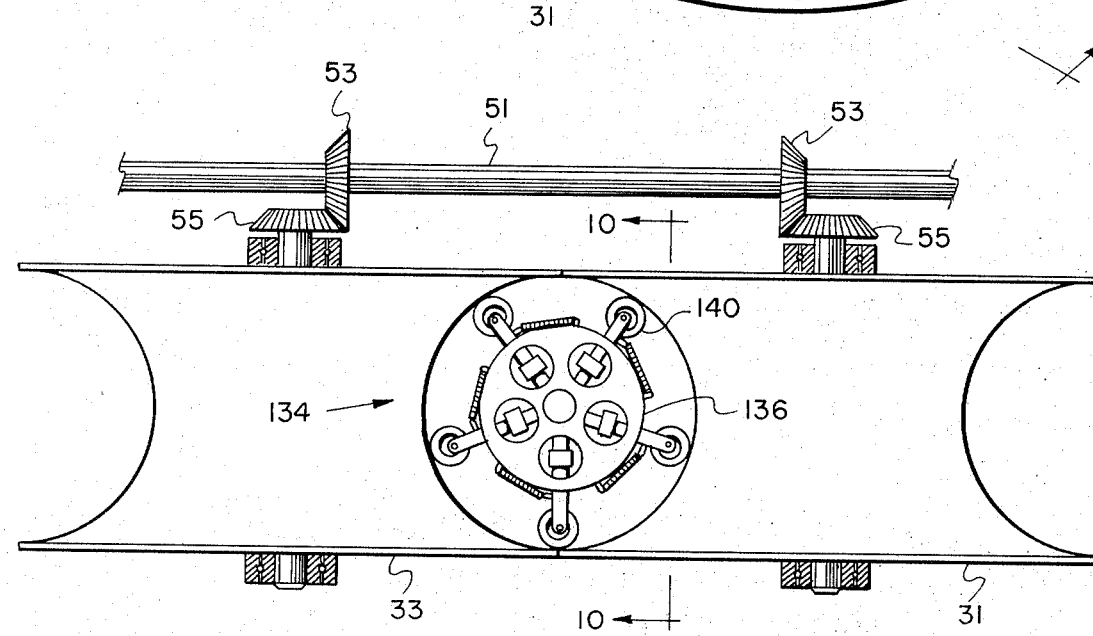
FIG. 9 is a view similar to FIG. 2 of the modified embodiment of the invention.

In operation, at standstill of the input shaft 32, the springs 66 co-operate with torque arms 50 to incline the plane of swivel of the swivel means 38 in a direction normal to the plane of rotation of the disc 36. On rotation of the input shaft 32, the eccentricity "$e$" of swivel shafts 38 relative to the point of contact of the wheels 40 (see FIG. 3) provides a swivel shaft moment on the swivel means 38 in a sense opposed to the tension of springs 66, so that the wheels 40 take up an inclined position (FIGS. 4 and 7).

Thus the eccentricity "$e$" of the wheels 40 represents the distance from the center of the swivel shaft 38 to the point of contact of the wheels 40 with the spool surfaces. This eccentricity "$e$" produces a swivel moment acting on the wheels 40 tending to align them with the plane of rotation of the disc 36. This swivel moment is opposed by the turning moment acting on swivel shafts 38 due to spring 66 pulling on torque arm 50. The application of a turning moment to the disc 36 thus produces partial swivelling of the wheels 40 about the respective axles, of the swivel shaft 38, with consequent generation of the rolling of the wheels 40 as a function of the rotation of the disc 36. This rolling of the inclined wheels provides a component which produces rotation of the spools 31, 33, causing them to rotate.

Figure 4:
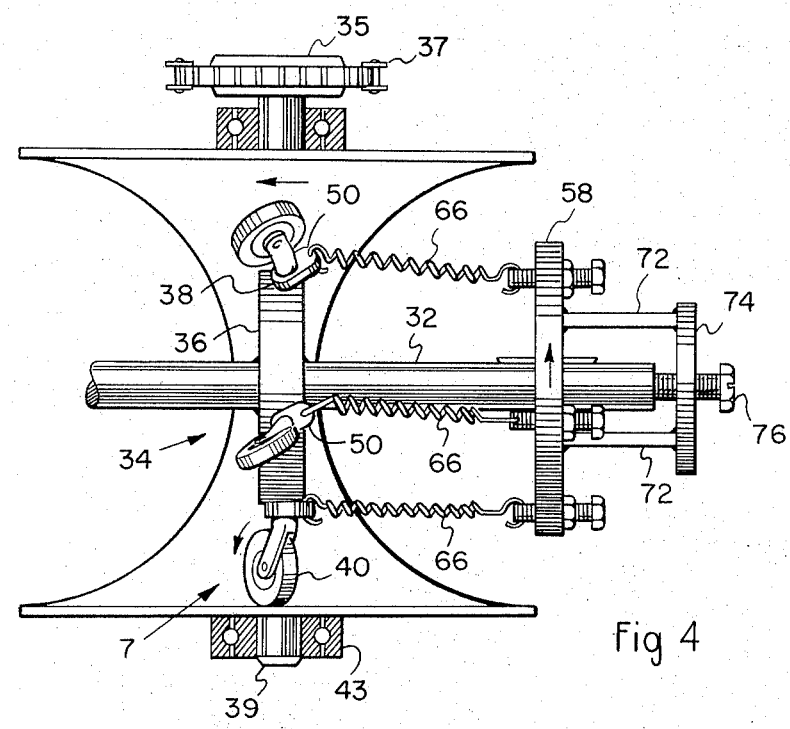
FIG. 4 is a view similar to FIG. 3, showing the speed changer in an operating position.

Rotation of the input shaft 32 produces rotation of the wheels 40, producing corresponding limited rotation of the spools as indicated by the rotational arrows in FIG. 4.

It will be evident upon inspection of the drawings that rotation of the input shaft 32 in either a clockwise or a counter-clockwise sense will result in swivelling of the wheels 40 to a trailing position, with consequent unidirectional rotation of the spools as indicated by the rotational arrows.

With reference to FIG. 7, it will be seen that should a compression spring be utilised instead of the tension spring arrangement as illustrated, and the torque arms 50 positioned in 180° reversed relation to the position illustrated, so as to coincide with the direction of castor inclination, that the rotation of the input shaft 32 will result in inclination of the swivel means 38 in an oppositely inclined sense to that illustrated, whereby the direction of spool rotation will be reversed.

The swivel angle of inclination of the wheels 40 is a function of the load on the spools 31, 33, so that the speed reducer is load compensating, to provide automatic reduction ratio adjustment, as a function of spool loading and the tension force exerted by springs 66. As the instantaneous radial position of each wheel 40 varies relative to the spool axis, the counter-torque acting against the side of the wheel also varies, so that as a wheel 40 moves from a position at maximum radius from the spool axis to a position at minimum radius from the spool axis, so the counter-torque of the spool tending to cause castering of the respective wheel 40 varies from a minimum value to a maximum value in cyclic fashion. Thus it will be seen that while the mean angle of wheel pitch will be balanced between torque forces and spring load, the instantaneous variation will cause the pitch setting force to vary cyclically. Thus each wheel 40 oscillates in cyclic fashion to balance the forces acting thereon as the wheel advances inwardly and recedes outwardly across the arcuate surface of a respective spool.

Turning to the embodiment illustrated in FIGS. 8 to 21, while utilizing similar spools 31, 33, there is shown a shaft drive 51, connected in driven relation with the spools 31, 33 by means of bevel gears 53, 55.

The speed changer 130 utilises a drive head assembly 134 attached to a shaft 132 for rotation therewith, having a disc 136 shown having five swivel means spaced thereabout, each having a wheel member 140 rotatably mounted on an axle 142 (see FIG. 18) carried by a pair of forks 144 mounted symetrically on a stub shaft 146 (FIG. 21) for swivel movement therewith. A torque arm 150 (FIG. 18) and peripherally extending spring 166 turn each wheel 140 to a neutral non-driving position of zerio pitch coincident with or parallel to the plane of the disc 136. A pitch control mechanism for each swivel means comprises a pivot arm 170 pivoted at 172 on the periphery of disc 174 attached to the drive shaft 132 for rotation therewith. A stirrup portion 176 is pinned at 178 to a sleeve 180 in radial displacing relation therewith, relative to the axis of input shaft 132 and the head disc 136.

A cam slot 179 having walls 182 in the sleeve 180 has a cam pin 184 engaged therein, the pin 184 extending from the stub shaft 146.

In operation, motion of a respective pivot arm 170 in radial displacement of the stirrup 176 produces corresponding radial displacement of the sleeve 180, with consequent swivelling of the stub shaft 146 as the cam pin 184 is displaced by travel of the cam slot. A spring 186 resists radially inward displacement of the wheel 140 under rolling load in crossing the surface of the spools 31, 33.

The actuation of the pivot arms 170 is provided by pitch control actuating means, comprising a generally conical body 190 (FIGS. 8 to 16) mounted on input shaft 132 by means of bearings 192 to permit free rotation of the shaft 132 while maintaining the body 190 in a non-rotating condition. A control linkage 194 (FIG. 17) pivotally mounted at 196 has a fork portion 198 attached by pivot pins 202 to a reduced collar portion 204 of the body 190, permitting the body 190 to be selectively positioned axially of the shaft 132 relative to the disc 136.

The body of the pitch actuating means has a reverse drive cam portion 206, a neutral cam portion 208 and a drive cam portion 210 (see FIGS. 11 and 12).

Each pivot arm 170 has a follower wheel 212 rotatably mounted thereon, being maintained in cam-following relation with the respective cam portions 206, 208, 210 by restraining springs 214.

FIG. 12 shows the follower wheels 212 in the reverse drive position, contacting the reverse cam portion 206, indicated in FIG. 11.

In this position (see FIG. 12 also) the pivot arms 170 position the sleeves 180 at their radially outermost position, thereby displacing the cam groove walls 182 to bring the cam pin 184 into coincidence with the reverse position designated "R." In this position the pitch angle of the wheels 140 produces output rotation of the output shaft 51 in a reversed operating sense.

With the actuating body 190 axially positioned by control linkage 194 to bring the neutral cam portion 208 into axial coincidence with the follower wheels 212, the cam groove walls 182 position the cam pin 184 at the neutral "N" position (see FIGS. 11 and 19).

In this condition the wheels are at zero pitch, being parallel with the disc 136 and having the axles 142 substantially parallel with the input shaft 132.

Further axial displacement of the actuator 190 brings the cam device portion 208 into contact with the follower wheels 212.

With reference to the intermediate cam surface portions 210 (FIG. 13) this is of oval shape to produce a cyclic variation in each of the follower wheels 212, resulting in a corresponding cyclic variation by increasing and decreasing the relative pitch angle of the wheels 140 in accordance with the cam profile, which provides instantaneous values of pitch angle variation in accordance with the position of the respective wheel 140 radially relative to the spool axis.

Figure 13:
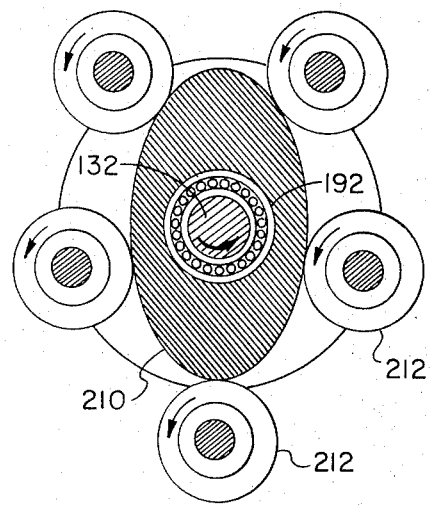
FIG. 13 is a cross sectional view on the line 13—13 of FIG. 10.
Figure 14:
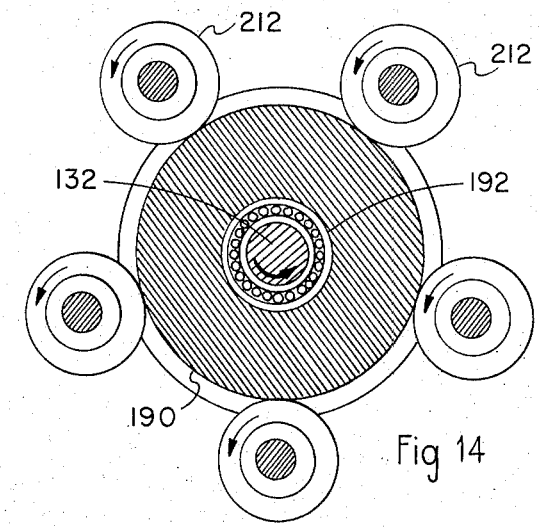
FIG. 14 is a cross sectional view on the line 14—14 of FIG. 10.
Figure 15:
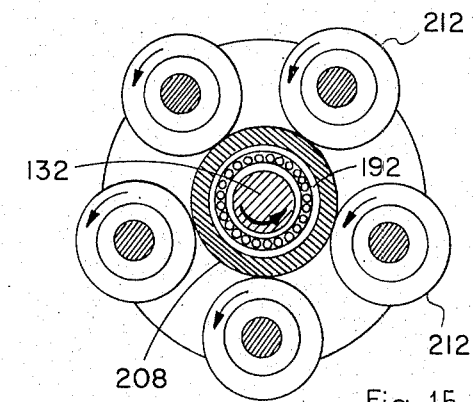
FIG. 15 is a cross sectional view on the line 15—15 of FIG. 11.
Figure 17:
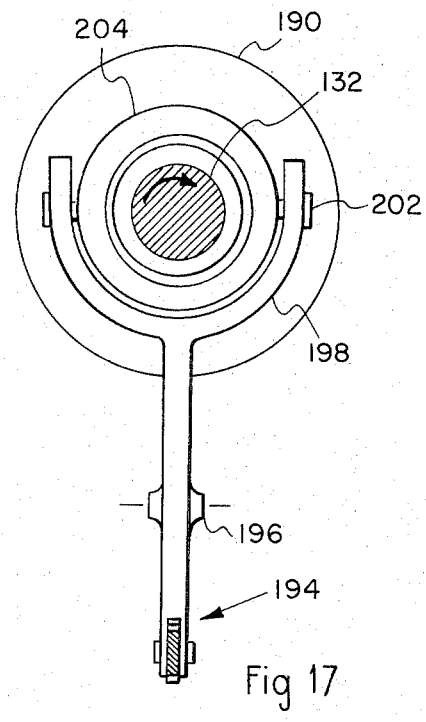
FIG. 17 is a cross sectional view on the line 17—17 of FIG. 11.
Figure 16:
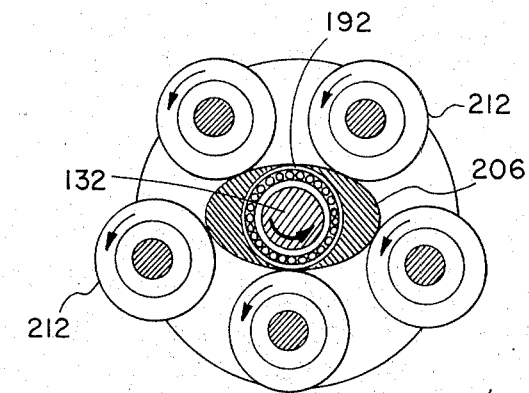
FIG. 16 is a cross sectional view on the line 16—16 of FIG. 12.

It will be seen that cyclic pitch correction is graduated having a maximum value for an intermediate portion of the ratio range of the forward drive cam 210, as indicated in FIG. 13 by the marked ovality of the cam section 213 as contrasted with the lesser ovality of the other cam section of FIGS. 14, 15 and 16.

Referring to the functional relationship of the FIG. 12 embodiment as described on pages 7 to 10, the instant angle of inclination of the wheels 140, relative to the plane of the disc 136 is dictated by the inclination of the lever arms 170, shown in three characteristic settings in FIGS. 10, 11 and 12, respectively. As disclosed in page 9, lines 10 to 27, with reference to FIGS. 18, 19 and 20, changes in inclination of rods 170 are converted by sleeves 180 and associated pins 184 operating in cam grooves 182 to produce corresponding inclination of the wheels 140 from the plane of disc 136. The provision of cyclic variations in the inclination of the wheels 140 stems from the fact that the instantaneous value of rotational velocity of the wheels 140 is a function of the distance of displacement of the respective wheels 140 from the axis of rotation of spools 33 and 31. Thus, when driving at the rim of spool 33 or 31 a maximum component of rotational velocity in the direction of spool rotation is required, while conversely, when wheel 140 is close to the axis of spools 33 or 31, a minimum velocity component in the direction of spool rotation is required in order to maintain power transmission with minimum slippage of the wheels 140.

It is theoretically deduced that the speed ratio is in accordance with the tangent of the pitch angle. While the maximum ratio angle might be justified theoretically as approaching 90°, with an infinite ratio provided thereby, it will be understood that friction and other loses limit the practical ratio that may be realistically achieved. In this regard, the properties of the arcuate spool surfaces are chosen in relation with the follower wheels diameter and the proportions of the driving head, to provide desired service characteristics.

It will be understood that the function of the illustrated embodiments may be reversed, wherein driving of the spools as an input will result in rotation of the input shaft, with appropriate reversal of the gear ratio.

What I claim is:

1. A variable speed changer device to provide speed variation between the input and the output thereof, comprising; A rotatable driven input shaft having a drive head means mounted thereon for rotation in a first plane normal to the axis of said input shaft, said drive head having a plurality of swivel means mounted in mutually spaced relation about the head for rotation therewith, with drive wheel portions thereof extending radially outwardly of the head, each swivel means being swivelably mounted to permit variable angular inclination of the plane of rotation of said drive wheel portions relative to said first plane; at least one output shaft mounted in spaced relation adjacent said drive head means for rotation on an axis substantially parallel to said first plane; a driven spool mounted on said output shaft in driving relation therewith having an arcuately profiled surface portion thereof to receive said drive wheel portions in successive arcuately displaced rotational relation thereacross upon rotation of said input shaft and said head means, and pitch control means to regulate the swivel inclination of each said swivel means relative to said first plane, to vary the relative impartation of motion of said drive wheel portions to said spool with rotation of said input shaft.

2. The speed changer device as claimed in claim 1, wherein said pitch control means includes torque sensitive means to control the swivel inclination of said swivel means in automatic load sensing relation with the load reaction of said output shaft.

3. The speed changer device as claimed in claim 1, wherein said pitch control means includes swivel angle selection means, pitch control actuating means having at least two alternative positions, with said selection means connected in controlling relation to select a said position, and control connecting means connecting said actuating means with said drive swivel means to position said swivel means at selected swivel angle.

4. The speed changer device as claimed in claim 2, said swivel means each being swivelably mounted on an eccentric stub shaft extending substantially radially of said drive head means; radial loading means loading said swivel means outwards from said head into resilient pressing engagement against said spool surface; torque arm means extending from said stub shafts, and adjustable spring means connected to said torque arm means in biasing relation therewith in a sense opposed to swivel motion about said eccentric stub shaft of said swivel means resulting from wheel load reaction, to provide balanced load-sensitive regulation of said changer.

5. The speed changer device as claimed in claim 3, wherein said pitch control actuating means is independently mounted on said input shaft having a plurality of peripheral cam surfaces in axially adjacent relation, each said swivel means having a said connecting means at one end thereof to contact a said cam surface in accordance with the selected axial position of said actuating means, stirrup means at the other end of said connecting means remote from the actuating means engaging the respective said swivel means in pitch controlling relation, said angle selection means being secured in axial positioning relation to said actuating means to control the axial setting of said actuating means, and lever means pivotally mounted adjacent said input shaft having one end thereof engaging said actuating means for positioning it in selected axial relation with said connecting means to provide a desired swivel-angle setting to said swivel means.

6. The speed changer device as claimed in claim 1, wherein said driven spool profiled surface circumscribes substantially an arc of 180°.

7. The speed changer device according to claim 1, having a plurality of said output shafts in mutually spaced relation to position said spool means in driven relation with said head means.

8. The speed changer device according to claim 1, having a pair of said output shafts in mutually spaced relation to position said profiled spool surfaces in complementary adjacent relation whereby said profile surfaces in said first plane form arc portions of a common circle.

9. The speed changer device according to claim 1, having a pair of said output shafts each having a said spool thereon in mutual co-operating relation with said drive swivel means to provide substantially a circular contact path for said drive wheel portions in said first plane.

10. The speed changer device according to claim 4, having a pair of said output shafts in mutually spaced relation to position said profiled spool surfaces in complementary adjacent relation whereby said profile surfaces in said first plane form arc portions of a common circle.

11. The speed changer device according to claim 2, wherein said pitch control means arc operable in stepless relation to provide stepless ratio selection.

12. The speed changer device according to claim 3, wherein said driven swivel means operate in cyclic relation with the rotation of said input shaft to cyclically increase and decrease said pitch angle during each revolution of said drive head.

13. The speed changer device according to claim 5, wherein said pitch control means has at least one first control position to provide rotational output in a first sense relative to the direction of rotation of said input shaft, and a second control position to provide output rotation in a second sense opposite of said first sense.

14. The speed changer device according to claim 5, wherein said pitch control means is moveable to a first forward drive position having a range of selective forward output speeds, a second neutral position wherein no output rotation is obtained when said input shaft is rotated in a driving sense and a third reverse drive position to drive said output spool means in a reverse rotation sense on operation of said input shaft in a driving sense.

* * * * *